UNITED STATES PATENT OFFICE.

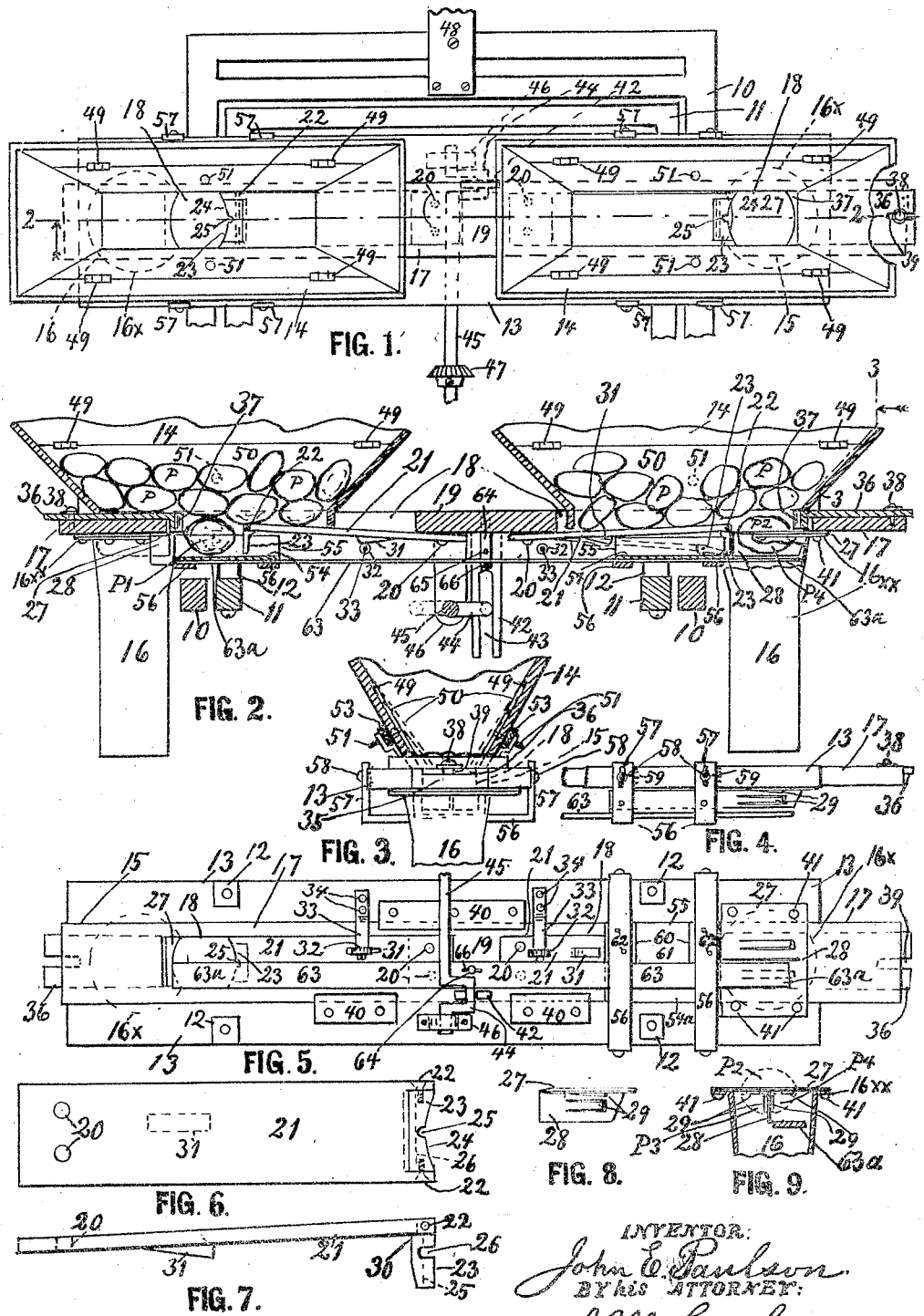

JOHN E. PAULSON, OF MINNEAPOLIS, MINNESOTA.

POTATO CUTTER AND PLANTER.

1,326,613.   Specification of Letters Patent.   Patented Dec. 30, 1919.

Original application filed December 5, 1918, Serial No. 265,445. Divided and this application filed June 23, 1919. Serial No. 306,220.

*To all whom it may concern:*

Be it known that I, JOHN E. PAULSON, a citizen of the United States, residing at Minneapolis, in the county of Hennepin and State of Minnesota, have invented a new and useful Potato Cutter and Planter, of which the following is a specification.

This invention relates to machines for cutting and planting potatoes. It is a portion of my convertible planting machine illustrated and described in my application filed December 5, 1918, Serial Number 265,445, which application will herein be referred to as the "complete machine" for several parts which it is unnecessary to repeat in each patent covering certain submechanisms thereof.

In the present drawing Figure 1 is a plan view of the front portion of the frame work of the machine equipped with my improved potato cutting and planting or dropping means. Fig. 2 is a substantially sectional view on the line 2—2 in Fig. 1. Fig. 3 is a right hand end view of Fig. 2 with the hopper intersected on the line 3—3. Fig. 4 is a left side view of Fig. 3 with many parts omitted. Fig. 5 is a bottom view of the hopper frame and seed slide and other parts shown to the right but omitted to the left since both sides of the machine are alike. Fig. 6 is an enlarged top view of one of the members of the potato feeding slide. Fig. 7 is a side or edge view of Fig. 6. Fig. 8 is a side view of one of the potato cutters. Fig. 9 is a left end view of Fig. 8 with a portion of one of the feeding tubes and of a potato supporting shelf in section added.

Referring to the drawing by reference numerals, 10 designates the main frame, of the machine, the same is mounted on an axle and a pair of ground wheels (shown in the complete machine) and within said frame is tiltingly mounted an inner frame 11, and across the front portion of said frame 11 is secured upon spacing blocks 12, a transverse slotted frame 13 upon which two hoppers 14 are, mounted. In the longitudinal slot 15 of said frame is fitted a slide adapted to feed potatoes from the hoppers into the dropping tubes 16. Said slide comprises several parts, of which 17 is the main body and is formed with two slots or apertures 18, one below each hopper leaving at the middle of the slide a solid margin 19.

Bolted loosely at 20 underneath each end of the margin is the inner end of a slide member 21 extending loosely into the slot 18 and having to its outer end pivoted at 22ª a flat block 23 provided with a concaved face 24 by which to move one potato at a time; it is also formed with notches or grooves 25, 26 as clearances for the sharp edges of a potato cutting device presenting a T-shaped edge, it being composed of a horizontal blade 27 and a vertical blade 28 depending therefrom, (see Figs. 8 and 9). Said blades are formed with diverging spring arms 29 struck up from the body of the blade and serving to prevent the cut potato from sticking or clinging to the faces of the blades. The block 23 may assume a linear position to the member or bar 21 and be dragged by it as shown by dotted lines 23 to the right in Fig. 2, but when the bar 21 is to push a potato the block 23 drops to the vertical position shown in Fig. 7, stopping with its shoulder 30 against the bar 21. This dropping movement takes place during the retractive movement of the bar 21, because said bar is provided at its under side with an incline 31, which then rides upon a roller 32 mounted on an arm 33 fixed at 34 to the frame 13 (see Fig. 5).

Each outer end of the slide 17 also has a solid margin 35 (see Fig. 3), into the top of which is recessed a short slide member 36, having a depending curved face 37 by which to push the upper half of each potato away from the top of the blade 27 after it has been cut and it is wanted for further operation, as will presently be described. Said short slide member is adjustably secured by a screw 38 in a slot 39 (best shown to the right in Fig. 1).

In Fig. 5 40 are strips helping to guide and retain the slide in the frame; it is also guided by the sheet metal plates forming the blades 27, said plates being secured at 41 to the frame 13 together with the horizontal flanges 16ˣˣ of the dropping tubes 16. 16ˣ are mere outlines indicating the location of each dropping tube 16, while the top flanges 16ˣˣ of the tubes may be square or of any other suitable form.

The slide 17 may be reciprocated by any suitable means, but in the present illustration the slide is shown as provided with a bifurcated arm 42, in the slot 43 of which operates the crank 44 of a crank shaft 45, journaled in a bearing 46, and another bearing (not shown) and is rotated by a bevel gear 47 having operative connection with one of the ground wheels, as fully shown in the complete machine first above referred to. 48 is pole by which the machine is drawn.

In each side of each hopper is attached by hinges 49 a false side member 50, which is provided with a standing bolt 51 extending loosely through the real side of the hopper and through a bracket 52 secured at the outside thereof and between said real side and bracket is threaded upon the bolt a gnarled nut 53, the turning of which will close the false side pieces more or less together with their lower edges so as to guide small or large potatoes into a center-linear position of the slots in the slide and the cutting edges of the cutters.

When a potato drops down into said slot it lands upon the bottom 54 of a short horizontal chute 55, which chute is secured upon horizontal bars 56, having slotted vertical arms 57, guided in recesses in the frame 13 and secured thereto by screws 58, said arms and the frame having scale marks 59 to indicate the raised or lowered position of the chute according as small or large potatoes are operated on.

In Fig. 5 is shown that each chute has only a small portion 54$^a$ of its bottom resting directly on the bars 56, the rest of the bottom rests on blocks 60 inserted between the bars and the thinner portion 61 of the bottom. Said parts are secured together by screws 62. In the spaces thus formed between the parts 54$^a$, 56, 60 and 61 is slidably inserted a flat strip 63, whose middle portion has an aperture loosely fitted upon a stud 64 depending from the slide portion 19 and having horizontal pins 65, 66 spaced above and below the strip to allow it to rise and fall with the adjustment of the chutes, without allowing it to spring too much up and down so it might become disengaged from the stud.

The mechanism driving the shaft 45, and which is fully shown and described in the complete machine, is so constructed that as a rule it imparts but half a turn to the shaft at a time and then lets the slide rest at each of its endwise movements until the dropped seed is by a certain valve dropped out of the tube, but when so desired the slide may also be kept in constant motion.

In further describing the operation of this device it may be stated that a lot of either small, medium or large size potatoes, P, is placed in the hoppers, and the false side pieces 50, the slide members 36 and the high or low position of the chute regulated accordingly.

As the machine is then drawn along the field and the shaft 45 rotated thereby, each potato dropping into each chute, as P$^1$, to the left in Fig. 2, is pushed by the block or head 23 against the adjacent cutter blades and is thereby cut into three pieces (see Fig. 9 and to the right in Fig. 2). The upper piece, P$^2$, is one half of the potato, the lower half is in that operation cut into two quarters, of which the quarter P$^3$ drops at once into the tube 16, but the quarter P$^4$ drops only down upon the shelf 63$^a$ formed of the adjacent end of the strip 63. When the slide makes its next movement, the quarter P$^4$ is swept off from the shelf by the end of the bottom of the chute and drops into the tube 16. This movement of the slide also causes the face 37 to push the half potato P$^2$ down into the chute where the next or third movement of the slide causes P$^2$ to be cut into two quarters by the blade 28 and be dropped one quarter at a time just the same as the first two quarters of that potato. The next movement of the slide causes the last quarter of the first potato to drop into the tube 16 and a second potato to drop into the chute. The next or fifth movement of the slide causes the second potato to be cut in three, and one quarter of it to be dropped, and so on and in like manner in each side of the machine as long as desired. By applying the speed changing means shown in the complete machine the slide will work at different speeds and thus plant the potatoes at different distances apart in each row.

In machines of this kind the potatoes have a tendency to clog and thus not pass each time down from the hopper. To overcome such tendency I have provided for a rising and falling movement of the head 23 and the end of the slide member carrying said head. Such movement I have found very effective to prevent clogging.

What I claim is.

1. In a potato planting machine and mounted in a frame adapted to be drawn over a field, a pair of seed dropping tubes spaced so as to plant two rows at a time, a feed slide extending across the frame and means for reciprocating said slide, a potato hopper mounted over each seeding tube and adjacent end portion of the slide, said slide having near each end an aperture for the potatoes to drop into from the adjacent hopper, a horizontal chute below said aperture and connected to the frame, a potato cutting device fixed on the frame above each dropping tube, and means carried by the slide for pushing each potato along the chute and against the cutting device.

2. The structure specified in claim 1, said cutting device having a T-shaped cutting edge and said chute being adjustable up and down so as to cause the upper half of each potato to pass upon the top of the cutter and the lower half to be cut into two quarters, a shelf moved by the slide for temporarily retaining one of the quarters from dropping into the tube, means for removing said quarter from the shelf during a retractive movement of the slide, and means on the slide for moving said half potato from the top of the cutter into the chute during said retractive movement.

3. The structure specified in claim 1, said means for pushing the potato along in the chute consisting of a flat arm hingedly attached with one end to the slide so as to vibrate with its other end up and down in the chute, and means on the frame and on the arm for causing the latter to vibrate.

4. The structure specified in claim 3, and a flat pushing block pivotally connected to the free end of the flat arm and adapted to drop to a vertical position upon the bottom of the chute every time the arm is lifted, and means for holding said block in vertical position as long as it is to push a potato toward and against the cutting device but not during the retractive movement of the slide.

5. In a potato cutting device, cutting blades having lateral inclined flat spring arms extending at each side from points rearward of the cutting edge and slanting outward to points still farther rearward.

6. The structure specified in claim 5, said spring arms being struck up from the blades carrying them.

7. The structure specified in claim 1, said hoppers having inwardly adjustable false side pieces adjacent the apertures in the slide, and means for regulating said false pieces.

8. The structure specified in claim 1, and end members slidably secured on the slide for reducing the length of each aperture in the slide when so desired.

In testimony whereof I affix my signature.

JOHN E. PAULSON.